US011514054B1

(12) United States Patent
Borthwick et al.

(10) Patent No.: US 11,514,054 B1
(45) Date of Patent: Nov. 29, 2022

(54) SUPERVISED GRAPH PARTITIONING FOR RECORD MATCHING

(71) Applicant: Amazon Technologies, Inc., Seattle, WA (US)

(72) Inventors: Andrew Borthwick, Kirkland, WA (US); Robert Anthony Barton, Jr., Short Hills, NJ (US); Stephen Michael Ash, Seattle, WA (US); Russell Reas, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 263 days.

(21) Appl. No.: 16/145,104

(22) Filed: Sep. 27, 2018

Related U.S. Application Data

(60) Provisional application No. 62/680,547, filed on Jun. 4, 2018.

(51) Int. Cl.
| G06F 16/2455 | (2019.01) |
| G06N 20/00 | (2019.01) |
| G06F 16/28 | (2019.01) |
| G06F 16/22 | (2019.01) |
| G06F 16/901 | (2019.01) |

(52) U.S. Cl.
CPC .... *G06F 16/24554* (2019.01); *G06F 16/2282* (2019.01); *G06F 16/285* (2019.01); *G06F 16/9024* (2019.01); *G06N 20/00* (2019.01)

(58) Field of Classification Search
CPC .......... G06F 16/24554; G06F 16/285; G06F 16/2282; G06F 16/9024; G06N 20/00
USPC ...................................................... 707/737
See application file for complete search history.

(56) References Cited

U.S. PATENT DOCUMENTS

| 7,899,796 | B1* | 3/2011 | Borthwick | ........ G06F 16/24556 |
| | | | | 707/692 |
| 2003/0212713 | A1* | 11/2003 | Campos | ............... G06K 9/6223 |
| 2005/0117801 | A1* | 6/2005 | Davis | .................... G06V 10/426 |
| | | | | 382/173 |
| 2008/0010304 | A1* | 1/2008 | Vempala | ............... G06K 9/6224 |
| 2009/0055361 | A1* | 2/2009 | Birdwell | ............... G06F 16/285 |
| 2012/0278263 | A1* | 11/2012 | Borthwick | ............. G06N 5/025 |
| | | | | 706/12 |
| 2012/0307894 | A1* | 12/2012 | Chien | ................... H04N 19/176 |
| | | | | 375/E7.243 |
| 2013/0013567 | A1* | 1/2013 | Constantinescu | ..... G06F 16/113 |
| | | | | 707/667 |

(Continued)

OTHER PUBLICATIONS

Reas et al., "SuperPart: Supervised Graph Partitioning for Record Linkage", Nov. 17-20, 2018, 2018, 2018 IEEE International Conference on Data Mining (ICDM), Singapore, 2018, pp. 387-396, doi: 10.1109/ICDM.2018.00054 (Year: 2018).*

*Primary Examiner* — Hosain T Alam
*Assistant Examiner* — Robert F May
(74) *Attorney, Agent, or Firm* — S. Scott Foster; Kowert, Hood, Munyon, Rankin & Goetzel, P.C.

(57) ABSTRACT

Supervised partitioning is used to perform record matching. A request to identify matches between records is received. A graph representation that indicates similarities between the records is partitioned and an evaluation of the partitioning is performed according to a supervised machine learning technique to generate a confidence value in the partitioning. An indication of equivalent records according to the partitioning and the confidence value of the partitioning may be provided.

20 Claims, 8 Drawing Sheets

(56) References Cited

U.S. PATENT DOCUMENTS

| | | | | |
|---|---|---|---|---|
| 2013/0212103 A1* | 8/2013 | Cao | ............... | G06F 16/215 |
| | | | | 707/E17.046 |
| 2014/0156606 A1* | 6/2014 | Beskales | ............... | G06F 16/215 |
| | | | | 707/692 |
| 2014/0280143 A1* | 9/2014 | Milenova | ............... | G06F 16/35 |
| | | | | 707/737 |
| 2014/0324861 A1* | 10/2014 | Ray | ............... | G06F 16/2453 |
| | | | | 707/737 |
| 2016/0359697 A1* | 12/2016 | Scheib | ............... | H04L 47/20 |
| 2016/0359872 A1* | 12/2016 | Yadav | ............... | H04L 63/1425 |
| 2017/0124452 A1* | 5/2017 | Tucker | ............... | G06N 5/048 |
| 2017/0308809 A1* | 10/2017 | Mozes | ............... | G06F 16/212 |
| 2018/0025059 A1* | 1/2018 | Batchu | ............... | G06F 16/24564 |
| | | | | 707/740 |
| 2018/0060744 A1* | 3/2018 | Achin | ............... | G06N 5/04 |
| 2019/0286617 A1* | 9/2019 | Abu-Abed | ............... | G06F 16/9024 |

\* cited by examiner

SUPERVISED GRAPH PARTITIONING FOR RECORD MATCHING

RELATED APPLICATIONS

This application claims benefit of priority to U.S. Provisional Application Ser. No. 62/680,547, entitled "SUPERVISED GRAPH PARTITIONING FOR RECORD MATCHING," filed Jun. 4, 2018, and which is incorporated herein by reference in its entirety.

BACKGROUND

For database deduplication/record linkage application, some approaches to detecting equivalence relationships in a database D is to divide the problem into four stages, normalization, blocking, pairwise matching, and graph partitioning. In normalization records are run through simple and sophisticated standardization procedures to remove unimportant typographical variance. This significantly improves results. Blocking algorithms can be used to cheaply identify possibly matching pairs of records in a way that avoids doing $O(n2)$ comparisons over all possible pairs of records. Pairwise matching algorithms may compute the score that each pair of records proposed by the blocking stage is actually a match. The matching similarity function may be denoted as $s(x,y) \mapsto \mathbb{R}$, where higher values of $s(\ )$ may indicate a greater likelihood that x and y belong to the same equivalence class. Graph partitioning may use the output of pairwise matching, which can be interpreted as a sparse weighted graph (e.g., usually large) to input records and the weighted edges are the model-calculated similarity score, $s(\ )$.

Figure 1:
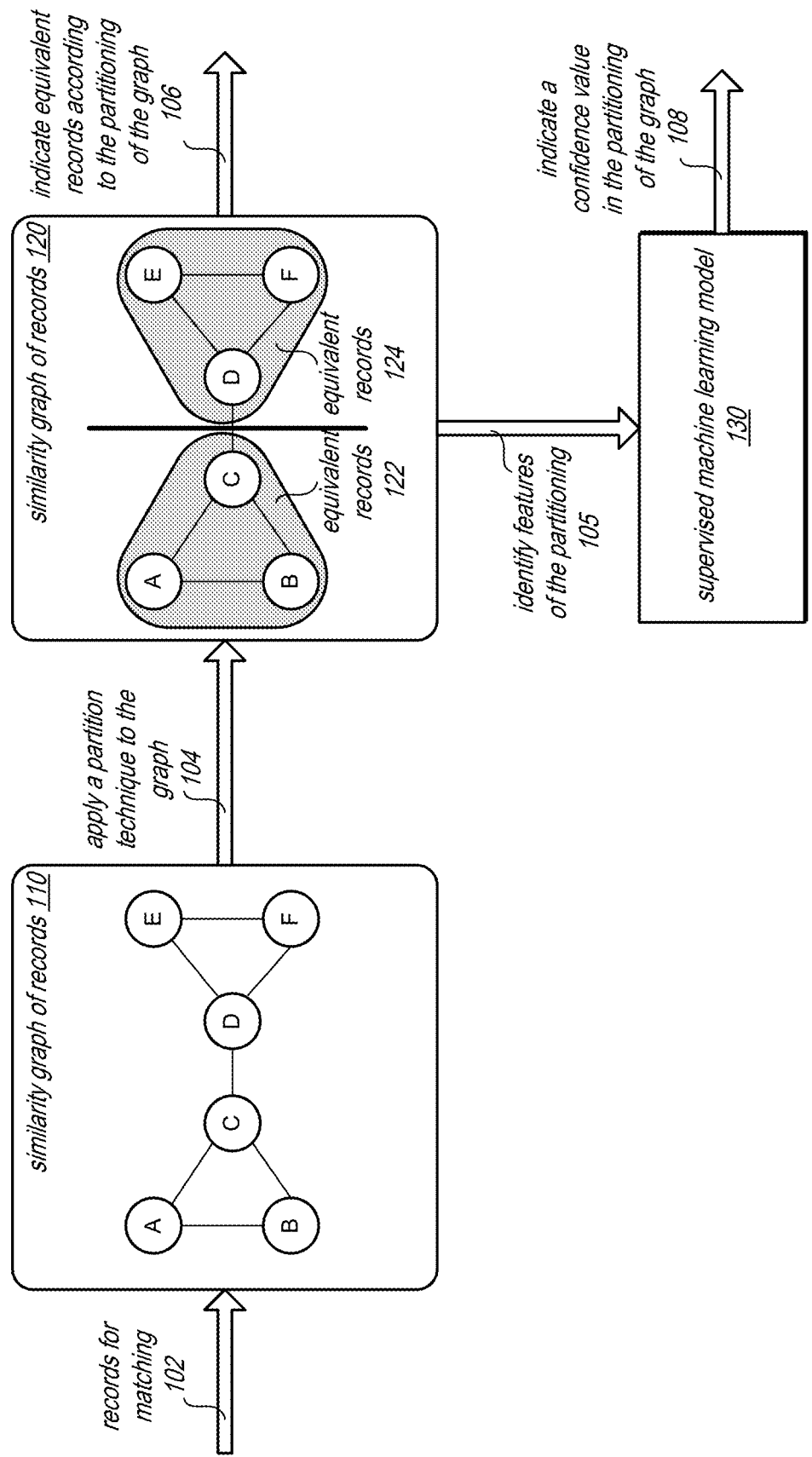
FIG. 1 illustrates a logical diagram of supervised graph partitioning for record matching, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of supervised graph partitioning for matching records are described herein. Computing a partitioning of a weighted graph that indicates similarity between records represented by nodes of the weighted graph may be performed to determine matching, similarities, associations, or other equivalence relationships between records (e.g., in a database), in some embodiments. One example application is the detection of duplicate records corresponding to the same real-world item in a database of structured records. Another example may be identifying functionally related proteins whose sequence similarity indicates that they share a common evolutionary history and have a similar function.

In these and other cases, the partitioning of a similarity graph may group all records detected to be equivalent (e.g., be associated, linked, similar, match or be the same, such as records that refer to the same real-world entity) into a partitioned portion of the graph (e.g., which may be identified or described as the same equivalence class). In some embodiments, all records may be respectively assigned to one partitioned portion of a similarity graph. For instance, a partitioning of a graph may include two different partitioned portions. Each record represented by the graph may be partitioned into one, and only one, of the partitioned portions. In some embodiments, a partitioned portion may include one or multiple records so that no partitioned portion exists that does not include at least one record. In at least some embodiments, no records may be assigned to multiple partitioned portions of a similarity graph, as record matching may conform to a strict partitioning of the input dataset instead of allowing the number of partitions to grow (e.g., in scenarios where K-means clustering is applied because K may not be known in advance and the number of partitions, (e.g., clusters or equivalences classes) may be unknown and is usually expected to grow proportional to $|D|$).

Equivalence relationships between records may be reflexive, symmetric, and transitive, in some embodiments. Thus, equivalency may be such that $a \equiv a$, $a \equiv b \Rightarrow b \equiv a$, and $a \equiv b \wedge b \equiv c \Rightarrow a \equiv c$. However, in some scenarios, record linkage of these equivalence relationships may be inferred from noisy measures over noisy data.

In some embodiments, supervised partitioning of a similarity graph to perform record matching may be understood as given D records as vertices with e computed edges, e.g.

by a similarity function s $(d_i, d_j)$, with possible errors in e, and a partitioning of approximately equivalent records such that the confidence of the resulting partitioned portions according to the partitioning, as determined by a model M, is maximized. Given the variety of definitions of matching, similarity or other forms of equivalence, M may be built from training data such that the resulting confidence values (e.g., scores or other indicators of a probability of the equivalence classification indicated by the partitioning) may reflect human labeling decisions. Additionally, in many industrial settings the confidence values may be used to prioritize costly human workflows (e.g., auditing if probability is below a threshold value).

In some embodiments, supervised graph partitioning may be performed after generating a similarity score for records. For example, in some embodiments, the connected components over the edges whose score is above some threshold separating the high and low scoring pairs may be used for partitioning. In such scenarios, even an imperfect but consistently erroneous similarity function s( ) may likely result in a graph for which a connected component algorithm is sufficient. However, if the ground truth indicates that a particular node should be connected and s( ) consistently says that it should be separated, there is no reasonable basis for a connected component algorithm to overrule s( ), in some embodiments.

In some embodiments, a sophisticated graph partitioner can be useful because similarity function s( ) may output inconsistent signals. By examining the larger context of the graph instead of only the pairwise score, better ways of partitioning the graph into clusters or other partitioned portions of matching, similar, and or other set of equivalent records may be beneficial to machine-based learning scenarios for record matching. For example, in a situation in which nodes [a; b; c] are tightly linked, as illustrated in FIG. 1, where a b and c may have high pairwise similarity values, nodes [d; e; f] are tightly linked, and the two sets of three are linked by a single high probability edge between c and d. It seems intuitive that the high value of similarity (e.g., s(c,d) =0.92) may be erroneous in this case. Alternatively, a native transitive closure algorithm could put all such nodes into the same partition. Supervised partitioning for record matching could indicate whether the partitionings suggested according to either technique were likely to be correct, in some embodiments, which could allow for multiple different partitionings of the same graph to be tried, as discussed in detail below with regard to FIGS. 4, 5 and 7.

In various embodiments, supervised graph partitioning for matching records may be implemented to apply supervised learning technique to graph partitioning for records or other data in a database. For example, in some embodiments, given a modest corpus of ground truth partitionings over a weighted graph, a machine-learned model may be trained to recognize characteristics of a good partitioning. In some embodiments, a model can use a feature vector constructed from a diverse ensemble of unsupervised partitioning algorithms as well as descriptive measures of a graph partitioning, as discussed in detail below with regard to FIGS. 4 and 7. This approach can produce a learned probability for a given partitioning and a set of alternative partitionings with potentially higher probabilities, in some embodiments.

In various embodiments, supervised graph partitioning for matching records may account for large numbers of records in order to scale graph partitioning for matching records. For example, in some embodiments, coarse clustering, or other partition technique may be performed to generate sub-graphs (e.g., a problem instance), as discussed in more detail below with regard to FIGS. 4, 5, and 7, may be used to coarsely performing partitioning of a graph into smaller, reasonably sized sub-graphs, which can then be further partitioned using multiple partition techniques, the results of which can be qualitatively analyzed according to the machine-learning model.

In various embodiments, supervised graph partitioning for matching records may be implemented to produce competitive results (e.g., best or within 0.5%) over manually selected and tuned clustering algorithms. In various embodiments, supervised graph partitioning for matching records may be performed without an exhaustive search for optimally hyper parameters or algorithms.

In some embodiments, a system implementing supervised graph partitioning for matching database records may utilize the following inputs and outputs (or other interactions). Other embodiments, however may utilize different interactions to perform supervised graph partitioning for matching database records, and thus the following inputs and outputs are not intended to be limiting.

For example, given a database D and partitioning D into distinct partitioned portions that identify equivalent records (e.g., equivalence classes) there may exists a pairwise similarity function $s(d_i, d_j) \mapsto \mathbb{R}$ for any $d_i, d_j, \in D$. A higher score from s( ) may indicate a greater likelihood that the pair of items are similar, (e.g., that the pair is likely to be matching (e.g., in the same equivalence class)). The availability of ground truth data that is available for training and testing may be cluster-wise or other partitioned portion-wise labels in which each record may be assigned a cluster id or other partitioning portion id such that records with the same cluster id represent matching items (e.g., represent the same real-world entity). In some embodiments, the ground truth datasets may contain a record id and a cluster id as a cross reference. In some embodiments, the cluster-wise labels may be collected from human auditors, which are presented with a graphical user interface containing a list of records, as discussed below with regard to FIG. 4. The auditor then drags records into distinct groups to indicate their equivalence classes, for instance.

FIG. 1 illustrates a logical diagram of supervised graph partitioning for record matching, according to some embodiments. Records 102 for matching may be database or other records that can be compared to determine equivalent records. Records 102 may be structured database records, in some embodiments, or may be semi-structured or unstructured data records which may share a common or corresponding set of column/field values (e.g., column A for one record may map to column F in another record in a different table). Equivalent records may be records that satisfy a similarity, link, association, or other threshold which can render the records identifying or pointing to a same item (e.g., physical or virtual), in some embodiments. The thresholds for equivalent records may differ according to the application upon which the equivalence determinations may depend, in some embodiments (e.g., matching records may be records that belong to a matching group, like books all in a book series, or a single entity, such as records that refer to a same movie).

Similarity graph of records 110 may be a weighted graph representation of the records for which matching may be performed. As discussed in detail below, multiple graphs and/or sub-graphs of records may be generated before performing a final partitioning to determine equivalent records, in some embodiments. For example, in some embodiments a coarse partitioning to split up a larger graph into sub-graphs (e.g., problem instances) that are of a manageable size so as to be computationally tractable. In a problem domain of record matching, connected components algorithm may be used that only considers edge weights above a threshold t=0:5, in some embodiments (other thresholds may be used in other embodiments). Similarity graph 110 may be a sparse weighted graph, in some embodiments. Blocking, normalization, and/or other techniques may be performed in order to first identify which records should be compared according to a pairwise similarity function in some embodiments which can then be used to generate the similarity graph 110, in some embodiments.

Similarity graph 110 may be partitioned according to a partition technique 104 so that equivalent records are identified according to the partitioned portion (e.g., equivalence class) identified by the partitioning, such as equivalent records 122, A, B, C, and equivalent records 124, D, E, F. The partitioning may be used to identify equivalent records according to the partitioning of the graph 106 (e.g., by building a separate list or structure indicating the nodes (which represent records) for each partitioned portion, or as discussed below, the records may themselves be updated to include additional information such as an equivalence class identifier which would indicate whether a record matched any other records with the same equivalence class identifier, in some embodiments. a Features of the partitioning may also be identified 105 and used to apply a supervised machine learning model 130, as discussed in detail below. In this way, a confidence value in the partitioning of the graph 108 may be generated and output 108 from supervised machine learning model 130. Various embodiments that implement supervised graph partitioning for matching records may increase system performance for record matching or other record linkage tasks by providing an extensible approach for incorporating ground truth labels for partitions of a similarity graph in the record linkage domain. Supervised graph partitioning for matching records may reduce the tedious, error-prone algorithm selection and tuning process and produces a useful clustering confidence score tailored to the specific problem domain, in some embodiments.

Supervised graph partitioning may be implemented in various embodiments to match (e.g., link) database records. For example, a matching application, system, service, or other component may implement the techniques discussed above to match, describe, or otherwise provide further information on the submitted records of one or more tables (or other collections of data in a database).

Please note that the previous description of combining nested data operations for distributed query processing is a logical illustration and thus is not to be construed as limiting as to the implementation of a data processor, a data store, a data set (or portions thereof), number or combination of nodes in a set.

This specification begins with a general description of a provider network that implements multiple different services, including a record linking service, database services, and other services, which may perform supervised graph partitioning for record matching. Then various examples of, including different components/modules, or arrangements of components/module that may be employed as part of implementing the record linking service are discussed. A number of different methods and techniques to implement supervised graph partitioning for record matching are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
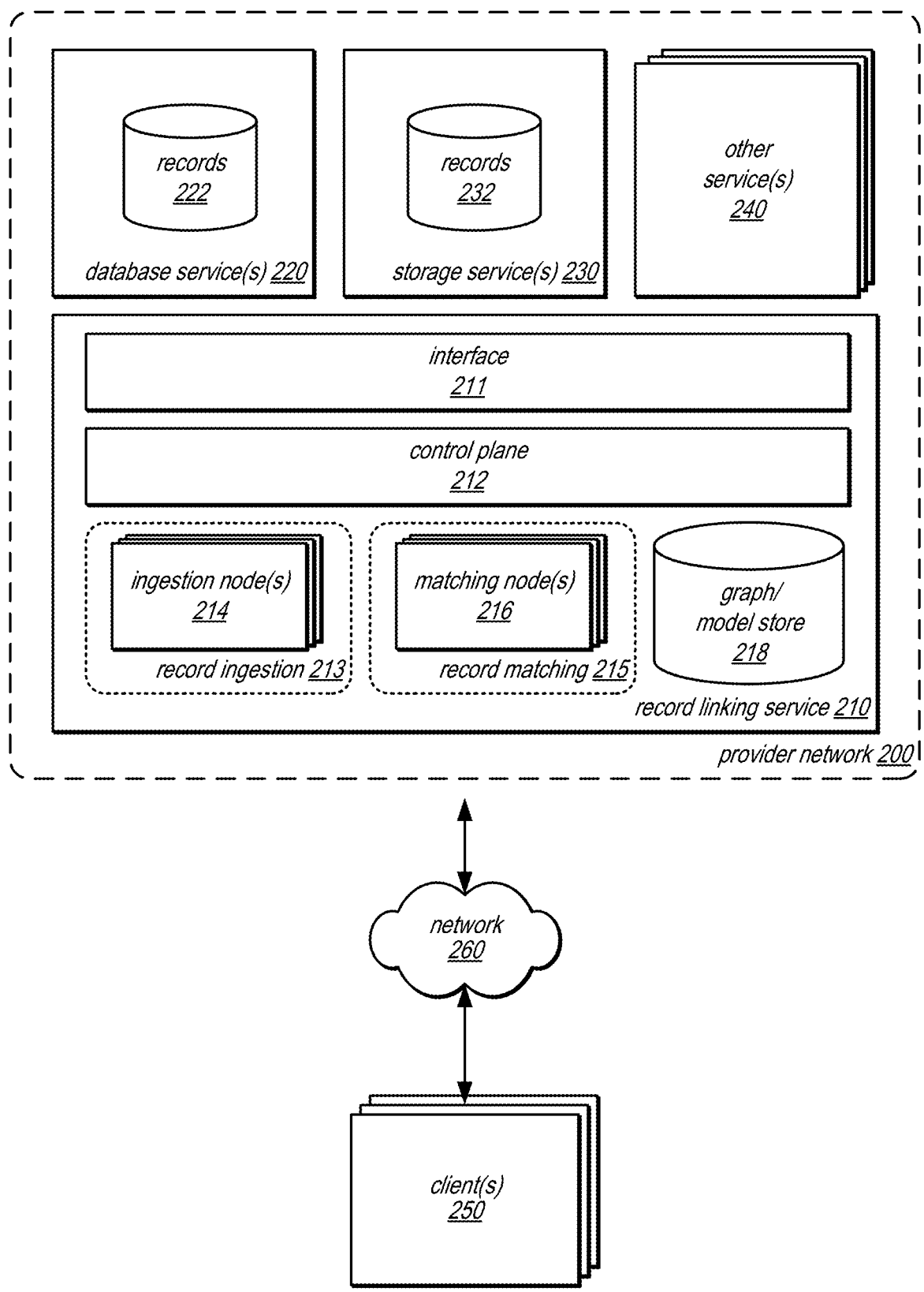
FIG. 2 illustrates an example provider network that may implement a service that implements supervised graph partitioning for matching records, according to some embodiments.

FIG. 2 illustrates an example provider network that may implement a service that implements supervised graph partitioning for matching records, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and services offered by the provider network 200, in one embodiment. In some embodiments, provider network 200 may implement various computing resources or services, such as record linking service 210, database service(s) 220, storage service(s) 230, and/or any other type of network-based services 240 (which may include a virtual compute service and various other types of storage, processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below, in one embodiment. In various embodiments, the functionality of a given system or service component (e.g., a component of database service(s) 210 may be implemented by a particular node or may be distributed across several nodes. In some embodiments, a given node may implement the functionality of more than one service system component (e.g., more than one data store component).

Record linking service 210 may implement interface 211 to allow clients to identify and evaluate links between records in order to determine matching records. For example, record linking service 210 may implement interface 211 (e.g., a graphical user interface, programmatic interface that implements Application Program Interfaces (APIs) and/or a command line interface) may be implemented so that a client can identify records in a data store, such as records 222 in database service 220, records 232 in storage service(s) 230, and/or records in other storage locations within provider network 200 or external to provider network 200 (e.g., on premise data storage in private networks). Interface 211 may allow a client to request the performance of matching evaluations and/or train the models used to perform probability analysis of partitions, as discussed in detail below.

Record linking service 210 may implement a control plane 212 to perform various control operations to implement the features of record linking service 210. For example, control plane may monitor the health and performance of requests at different components, such as ingestion nodes 214 and/or matching nodes 216. If a node fails, a request fails, or other interruption occurs, control plane 212 may be able to restart a job to complete a request (e.g., instead of sending a failure response to the client). Control plane 212 may, in some embodiments, may arbitrate, balance, select, or dispatch requests to different node(s) (e.g., ingestion nodes 214 or matching nodes 216), in various embodiments. For example, control plane 212 may receive requests interface 211 which may be a programmatic interface, and identify an available node to begin work on the request.

Record linking service 210 may implement record ingestion 213, as discussed in detail below with regard to FIG. 3. Ingestion nodes(s) 214 may perform various stages, operations, or tasks of ingestion, and/or may operate as individual pipelines or workflows to perform an entire ingestion request (e.g., individually or as a cluster/group of nodes), in some embodiments.

Record linking service 210 may implement record matching 215, as discussed in detail below with regard to FIG. 4. Matching nodes(s) 216 may perform various stages, operations, or tasks of matching, and/or may operate as individual pipelines or workflows to perform an entire matching request (e.g., individually or as a cluster/group of nodes), in some embodiments.

Graph/model store 218 may be one or more data storage systems or services (e.g., hosted by another provider network 200 service), that can store generated similarity graphs, proposed graphs, and/or machine learning models to perform record matching, as discussed below with regard to FIGS. 3 and 4.

Recording linking service 210 may provide many benefits to a user by providing both matching indications and probability of correctness. For example, very frequently in an industrial record linkage system users want to know the system's confidence in a matching. Thus high confidence value matches can be automatically merged (as provided by record linking service 210), low confidence value matches can be disregarded (as provided by record linking service 210), and intermediate confidence value of matches can be sent to clerical staff for human review (as provided by record linking service 210). Another benefit that record linking service 210 can provide is that probability of correctness scores are assigned to sub-graphs (e.g., coarse clustering). A performance benefit of sub-graphs is a sub-graph can be generated to be sufficiently small that it is tractable by a super-linear partitioning and a sub-graph may be small enough that it is of tractable size for human review (e.g., fit on a single screen).

In some embodiments, recording linking service 210 may provide an interface for re-clustering suggestion and score based on candidate proposers.

Database service(s) 220 may include various types of database services (both relational and non-relational) for storing, querying, and updating data. Such services may be enterprise-class database systems that are highly scalable and extensible. Queries may be directed to a database in database service(s) 220 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds of object or file data stores for putting, updating, and getting data objects or files. For example, one data storage service 230 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as audio files and web site log files. Data storage service(s) 230 may be accessed via programmatic interfaces (e.g., APIs) or graphical user interfaces. For example, format independent data processing service 220 may access data objects stored in data storage services via the programmatic interfaces Generally speaking, clients 250 may encompass any type of client that can submit network-based requests to provider network 200 via network 260, including requests for recording linking service (e.g., a request to analyze or append data to a database of records, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of record linking service 210 to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. Clients 250 may convey network-based services requests (e.g., access requests to read or write data may be via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
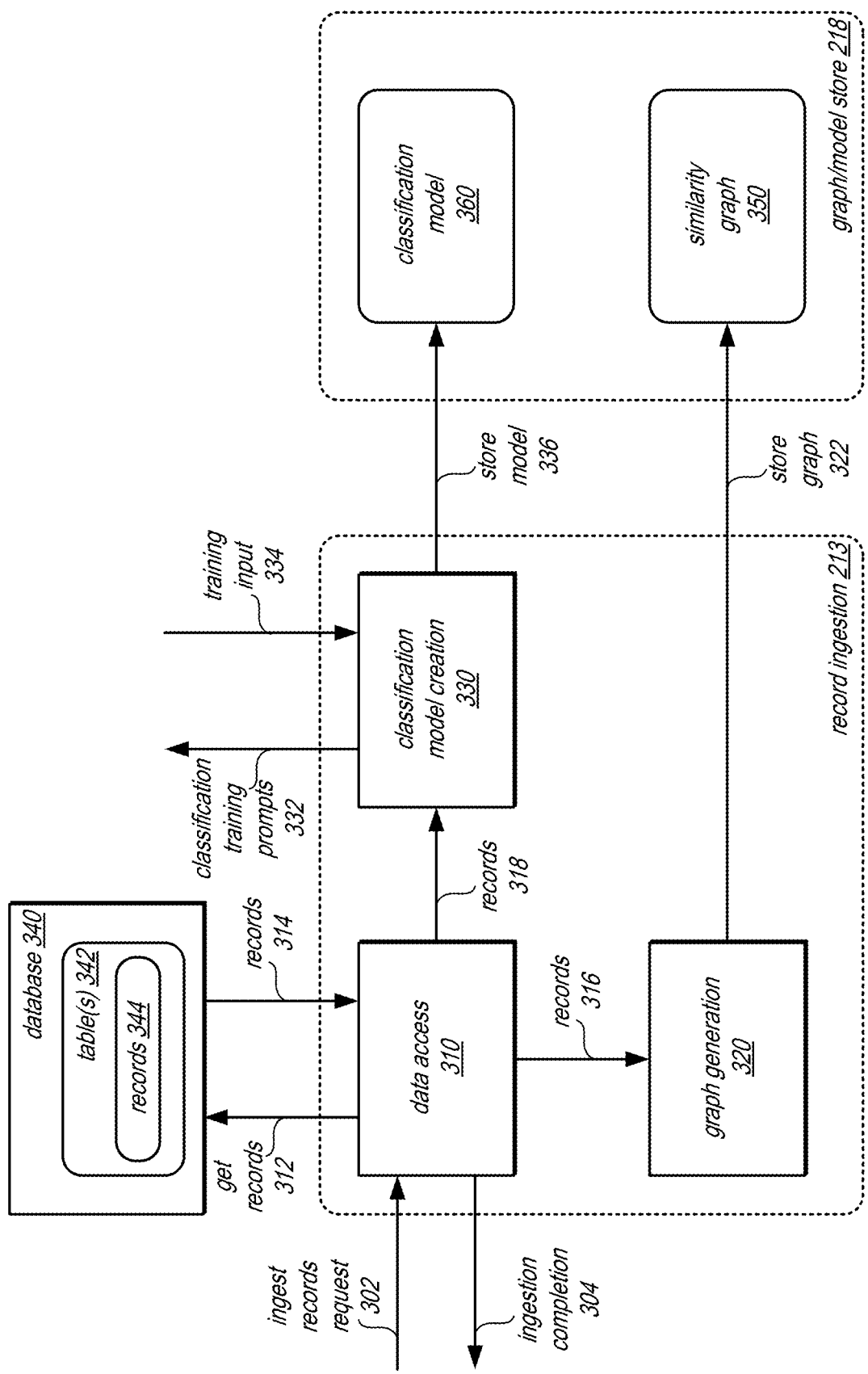
FIG. 3 illustrates a logical block diagram for data ingestion of a record linkage service, according to some embodiments.

FIG. 3 illustrates a logical block diagram for data ingestion of a record linkage service, according to some embodiments. Record ingestion 213 may receive a request 302 to ingest records for record matching (e.g., from a client). The request 302 may identify one or more database tables, such as table(s) 342 storing records 344 in database 340 (or other set of records, which could be found in one location or distributed across multiple locations). Data access 310 may get 312 records 344 by sending queries, or other read requests, which may then return the records 314 to data access 310. Data access 310 may implement various database system, storage system, or other interfaces or protocols in order to retrieve the identified data.

In some embodiments, data access 310 may perform various modifications or pre-processing operations to structure, flatten, or otherwise ready the records for graph generation. Data access 310 may provide the records 316 to graph generation 320, in some embodiments. Graph generation 320 may perform various operations, such as normalization to ready records by removing unwanted variance, standardizing format, and so on, in some embodiments. Graph generation 320 may perform one or multiple types of blocking algorithms to identify possibly matching pairs of records without having to perform pairwise matching for all possible combinations of records (e.g., O(number of records)$^2$), in some embodiments. To generate a graph, graph generation 320 may perform pairwise matching according to a similarity function for the pairs of records which may return higher values that correspond to higher similarity, in some embodiments. From the pairwise similarity scores, a weighted graph may be generated that connects records represented as nodes in the weighted graph where the edges represent the similarity weights. In some embodiments, only those edges with a value above a threshold may be considered (e.g., greater than 0.4). Graph generation 320 may store 322 the graph 350 as part of graph model store 218, in some embodiments.

Data access 310 may provide the records 318 to generate a classification model at classification model creation 330, in some embodiments. In a least some embodiments, users may interactively train or supply labeled data), as indicated by classification training prompts 332 and training input 334. At training time, the same techniques to generate proposals and feature vectors, as discussed below with regard to FIGS. 4, 5, 6, and 7, may be performed, in some embodiments. Then, supervised classification model (e.g., a binary classier, such as a Random Forest) may be trained to classify each proposal based on whether it matches the ground truth training input 334. The model 360 may be stored 336 in graph/model store 218, in some embodiments.

Figure 4:
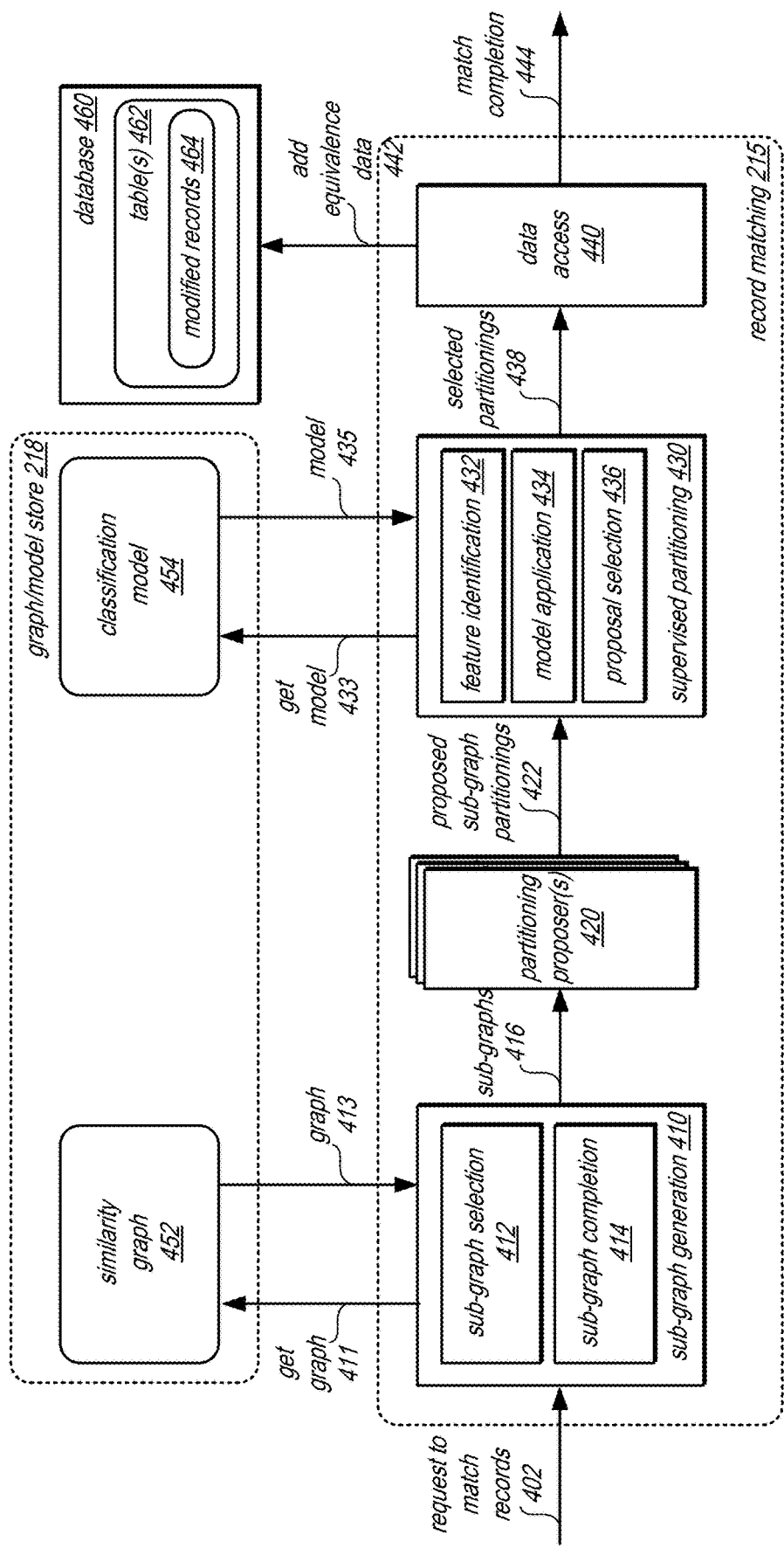
FIG. 4 illustrates a logical block diagram for record matching of a record linkage service, according to some embodiments.

FIG. 4 illustrates a logical block diagram for record matching of a record linkage service, according to some embodiments. A request 402 to match records may be received. The request may identify the records (which may be evaluated to determine if the records have been previously ingested), in some embodiments. Sub-graph generation 410 may implement sub-graph selection 412. Sub-graph selection 412 may get 411 a similarity graph 452 from graph model store 218, by requesting, copying, or reading, for instance, from graph/model store 218 to receive 413 graph 452, in some embodiments.

Figure 5:
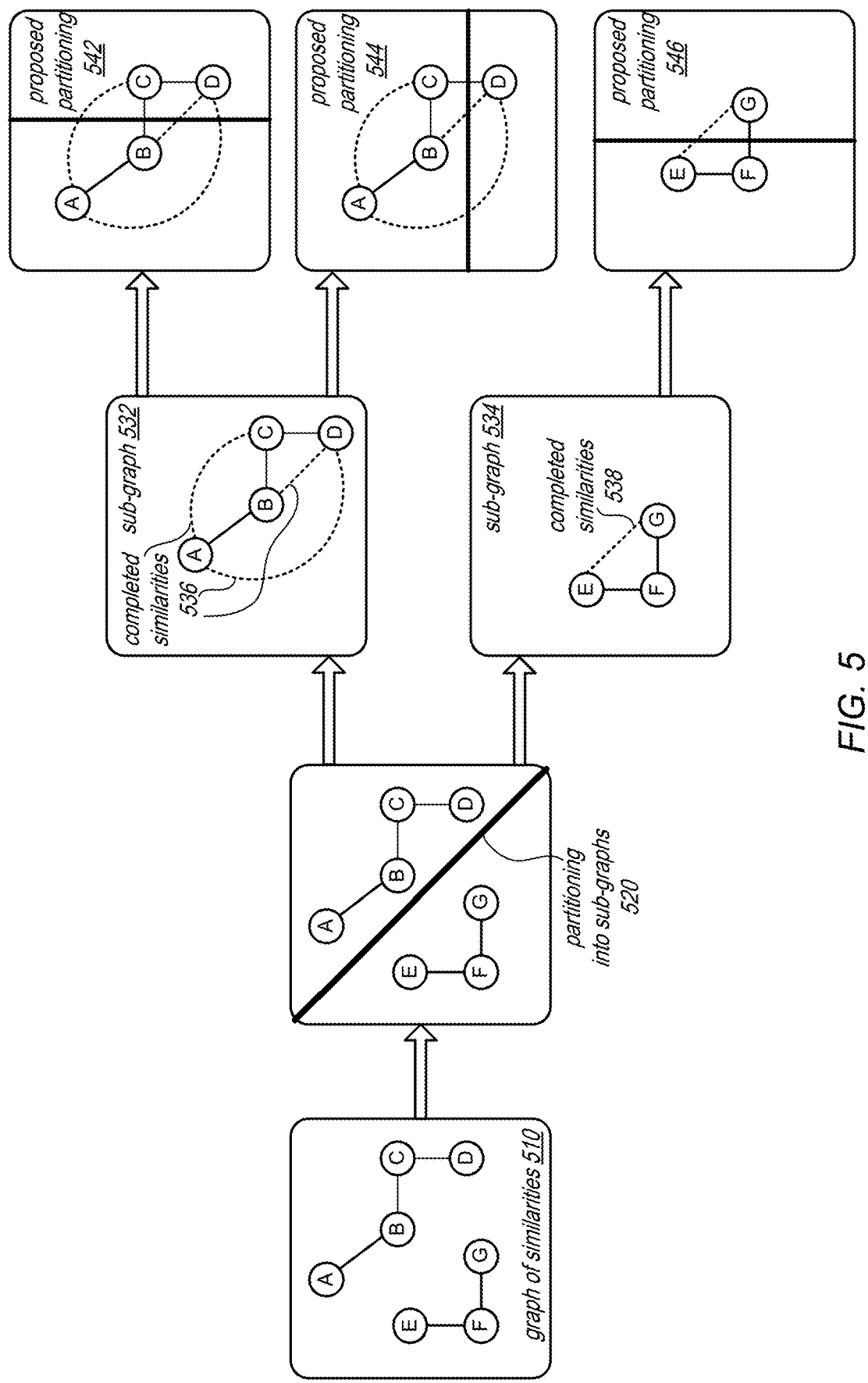
FIG. 5 illustrates an example logical diagram of the generation of proposed sub-graph partitions, according to some embodiments.

Sub-graph selection 412 may perform various techniques divide similarity graph 452 into sub-graphs (e.g., problem instances). FIG. 5 illustrates an example logical diagram of the generation of proposed sub-graph partitions, according to some embodiments. Graph of similarities 510 can be partitioned into subgraphs 520, including nodes E, F, G and A, B, C, D. In various embodiments, sub-graph selection 412 may apply a partition technique to subdivide the input sparse weighted graph G=(V,E) into a set of m reasonably-sized sub-graphs $G'_i=(V'_i, E'_i)$, where V', in this context refers to the vertices in G', and E's is the set of all edges between vertices in $V'_i$. Sub-graph selection 412 may be represented as $\varphi\ (G=(V,E)) \mapsto \{G'_0, \ldots, G'_{m-1}\}$, where $\forall_{V'_i \in} |V'_i| \leq k$. In this context k may be some reasonable upper bound on the size of each sub-graph, in some embodiments. For example, a value of k≤200 may be reasonable because that is the most number of records on a screen that a human auditor can effectively deal with at a single time.

A thresholded transitive closure clustering algorithm may be used to perform $\varphi$ in some embodiments. In some embodiments, a transitive closure clustering algorithm may be described $\hat{G}=(V, \hat{E})$ where $\hat{E}=\forall_{(x,y)\in}s(x,y)\geq t$. Then, our simple $\varphi$ may emit m sub-graphs $G'_i$ for each of the m connected components in $\hat{G}$. In some embodiments, a threshold t=0.5 may be used, which resulted in no problem instance $G'_i$ having more than 200 vertices. The choice of 0.5 may be reasonable, in some embodiments, when edge weights are the probability that two nodes are equivalent. In many record linkage approaches so can be made to emit a probability or some other well-calibrated score for which one can easily pick a threshold. In some embodiments, other sub-graph selection techniques can be utilized.

In at least some embodiments, sub-graph generation 410 may implement sub-graph completion 414 to determine the similarity values between some nodes in sub-graphs (which may have been removed in previously operations on the similarity graph, such as when similarity graph 452 was created) in various embodiments, so that complete graph weights may be created. As noted above, in some embodiments record linkage systems may use a blocking step, because it may be infeasible to compute the pairwise similarity $s(d_i,d_j)$ for all record pairs $d_i, d_j$ for a database D when |D| is large. The implication then is that G may be sparse and hence the sub-graphs $G'_i$ will likewise be sparse. Although supervised partitioning for record matching can operate on a sparse graph, it may also be applied to a complete sub-graph, and thus in some embodiments the complete sub-graph may be computed, $\hat{G}'_i=(V'_i,\hat{E}'_i)$ and $\hat{E}'_i=E'_1 \cup \{s\ (x,y)|(x,y)\in V'_i \times V'_i\ \wedge (x,y) \notin E'_i\}$ (e.g., any missing edges from the problem instance). As illustrated in FIG. 5, each sub-graph 532 and 534 may have edges added (represented by the dotted lines at 536 and 538) to complete the sub-graphs.

In some embodiments, the complete graph may be included because the proposal scoring model can then have a complete picture of the problem instance. Having all of the weights may provide more detail and/or more descriptive features, which the model can use to distinguish good partitions from bad.

In various embodiments, partitioning of the instances may be performed according to various example stages discussed below. Sub-graphs 416 may then be provided to partitioning proposer(s) 420. Since the number of unique partitions for a set of size n can be exponential in n, it may not be possible to consider every possible partitioning, in some embodiments. Instead, in some embodiments a collection of proposers 420 may be used, where each proposer may be a clustering algorithm that computes a candidate or proposed partitioning of the sub-graph, where in this case the proposer suggested q final partitionings for the sub-graph. Running multiple proposers over the sub-graph, multiple different proposed partitionings may be determined, in some embodiments. For example, in FIG. 5 two proposed partitionings, 542 and 544, may be determined for sub-graph 532 and one proposed partitioning, 546, may be determined for sub-graph 534.

With a large number of proposers in some scenarios, it is unlikely that the proposers will all suggest a different partitioning of the sub-graph. Therefore over all proposers 420, a determination of whether a unique partitioning for sub-graph i (potentially powered by more than one proposer) may be performed. In this way, proposers 420 may consist of a set of parameterized graph partitioning algorithms that cover a broad set of diverse algorithms with various configuration parameters, in some embodiments.

For example, different proposers 420 may include:
1. Identity: where each sub-graph is passed through without modification.
2. Transitive Closure: given a threshold t select only edges with weight greater than t in a given sub-graph. Then return all connected components in the modified sub-graph.
3. Markov Cluster Algorithm (MCL): A fast and scalable unsupervised clustering algorithm based on simulation of (stochastic) flow. MCL uses a non-negative stochastic column matrix where an entry $w_{ij}$ corresponds to the probability of moving from node i to node j in a random walk on the graph (and vice-versa). There are two primary parameters for MCL: The inflation rate controls whether more probable random walks are favored and the expansion rate controls the length of random walks. In some embodiments, a naive implementation of the algorithm may be used on a dense matrix.
4. Center and Merge-Center may be used, in some embodiments. Both Center and Merge-Center may produce a graph partitioning after a single pass through a sorted edge list. These algorithms may be parameterized with a threshold t via the same method applied to Transitive Closure as described above. The Center algorithm merges nodes into a cluster with a center of sufficient similarity to any unclustered node. Sorting edges by edge weight in descending order and starting with the heaviest-weight edge, one associated vertex to be a center may be selected and the other vertex may be assigned to its cluster. Subsequent edges have the same behavior if both vertices are currently unassigned. If only one is assigned and is also a center then the other is assigned to its cluster. If both are assigned then the edge is skipped and no reassignment happens. The Merge-Center algorithm follows the same approach, however, it also allows for the merging of two clusters if their centers are similar.
5. K-Core: for a threshold t, the K-Core algorithm yields sub-graphs of a problem instance such that each node in the sub-graph connects to at least k other nodes in the same sub-graph after removing edges less than or equal to the threshold j. Singletons are returned as such.

Since proposers 420 can be diverse, in some embodiments, the partitionings may be diverse. In some embodiments, the ground truth clustering may be present in the n proposals. In some embodiments, synthetic proposals in the data used for training may be included whenever a particular ground truth clustering was not present in one of the proposals.

Proposed sub-graph partitions 422 may be provided to supervised partitioning 430, in some embodiments. Feature identification 432 may be implemented to determine features for applying a machine learning model. Features for supervised graph partitioning for matching records may be determined in various ways. For example, for each candidate partition, the confidence value, which may, in some embodiments be the probability that the candidate partitioning includes the ground truth clustering, may be modeled. A standard supervised learning approach may be used, in some embodiments, by treating the problem as a binary classification task, where at training time, a model M=supervised_learning (F,L) where F is a |P|×f feature matrix and L is our length |P| ground-truth labeling of each proposer is computed. L is constructed by $L(P_{i,j})=(P_{i,j}==Y_i)$. Since $P_i$ may be unique proposals, zero or one true labels may be returned for each sub-graph $G'_i$ and all other proposals may be labeled false.

A feature vector of length f for each $P_{i,j}$ may consist of two broad categories of feature values: indicator functions for each proposer 420 and descriptive weighted graph measures, which are discussed below.

In some embodiments, proposers 420 may be features. By construction, for every partitioning $P_{i,j}$, there may exist at least one proposer 420 such that propose $(P)=P_{i,j}$. The first category of feature values may simply be a Boolean vector of length |π| indicating whether the corresponding proposer $π_p$ predicted this partitioning. In this way, every proposer 420 may become a feature in F. Different proposers 420 may be better suited for a particular problem domain or dataset. By including the binary indicator highlighting which proposer suggested a given partitioning, the model may learn about the overall expectation of how each proposer will perform on this problem domain.

In some embodiments, weighted graph metrics may be features. The second category of features in F are real or Boolean valued metrics that describe a partitioning. These features are engineered in order to provide signal to the classification model about different characteristics of clusterings. Different problem domains may have different definitions of what is a good partitioning. Even within the same dataset, for example, a ground truth might contain a heterogeneous set of labeled truth clusters. These descriptive features may allow the model to associate detectable patterns and characteristics of candidate proposals with the ground truth's definition of a good clustering, and thus a high confidence value partitioning. There may be multiple sub-categories of these metrics, in some embodiments.

First, consider a (sub-graph, partitioning proposal) pair: $(G'_i=(V'_i, E'_i), P_{i,j})$, which for simplicity in this section may be referred to as (G=(V, E), P). The first sub-category of descriptive metrics omits all edges in E that cross partitions within P and omits all edges with a weight below a threshold t, such that Consistent$(v_i, v_j)=(P(v_i)==P(v_j))$ (e.g., both vertices are in the same partition). Then, a partitioned, thresholded graph, G' may be described as follows: $G'=G(V, \{(x,y)\in E | \text{Consistent}(x,y) \wedge s(x,y) \geq t\})$. The following metrics may be determined for G':

Biconnected: given a set of thresholds to test, the feature value is the maximum threshold at which each partitioned portion of a sub-graph is biconnected (ignoring singleton partitioned portions, which are partitioned portions with only a single element). Only edges that have weights greater than the threshold being tested are considered when testing biconnectivity. Thresholds j may be tested in the interval j∈[0:1; 0:9] incrementing by 0:1 and return the maximum j as a single feature.

Diameter: the diameter of a graph is the longest shortest path distance between any two nodes in the graph. In the context of a partitioned, thresholded proposal, each partitioned portion has a possibly different diameter. One feature value can be emitted for various diameters, d. For each d, the maximum edge threshold w may be computed such that every partitioned portion has diameter≤d. For example, d∈[1, 2, 3, 4] can yield four different features. Diameter characterizes the density of partitions and captures whether many low weight edges affect shortest paths, in some embodiments.

The second sub-category of descriptive features may also operate on a (sub-graph, partitioning proposal) pair but unlike the first sub-category may not drop cross-partitioned portion edges. That is these metrics may be computed on G'=G(V, {(x,y)∈E |s(x,y)≥t}).

Coverage: the ratio of within-partitioned portion edges to the total number of edges in a sub-graph. If all edges are within-a partitioned portion, then the coverage of the sub-graph is 1:0. A single, preselected threshold of 0:5 to filter edge weights for coverage calculations may be used, in some embodiments.

Performance: the ratio of intra-partitioned portion edges plus missing cross-partitioned portion edges to the total number of possible edges in the sub-graph. A single preselected threshold of 0:5 to filter edge weights before calculating performance may be used, in some embodiments.

Additionally, descriptive features on the original, unthresholded (sub-graph, partitioning proposal) pair (G= (V, E), P), such as:

Size (in jV j) of the problem instance
Minimum weight edge internal to any partitioned portion
Mean and variance in weight for edges internal to any partitioned portion
Maximum weight edge crossing two partitioned portions
Mean and variance in edge weights crossing two partitioned portions
Size (in |V|) of the largest partition. This includes both the absolute size and the relative size, which is the size of the largest partitioned portion divided by
The total number of partitioned portions in the proposed partitioning of the sub-graph
The total number of edges less than a selected threshold internal to any partitioned portion. This feature may be calculated for a number of preselected threshold values in the interval [0.1, 0.9] incrementing by 0.1, in some embodiments.
The total number of edges greater than a selected threshold crossing any two partitioned portions. This feature is calculated for a number of preselected threshold values in the interval [0.1, 0.9] incrementing by 0.1, in some embodiments.

Model application 434 may be used to apply a machine learning model to identified features, in some embodiments. For example, given the feature matrix F and labels L, the model M=supervised_learning(F,L) may be computed where supervised_learning is a supervised learning algorithm for binary classification that produces some calibrated score in [0 . . . 1], to be a confidence value, in some embodiments. For example, in some embodiments, a Random Forest model implemented with hyper parameters of 100 trees with a max depth of 2 may be used.

Proposal selection 436 may select a proposed partitioning according to the confidence values of the proposed partitions. For example, at run time, the proposal with the maximum score from the classification model: $P_{i,j}$=argmax$_j$ (M($P_{i,j}$)) may be picked. The score for the proposal may be the measure of confidence on the partitioning. In an alternate scenario, a confidence score on an existing partitioning can be determined by choosing the score corresponding to the proposal with the indicator that is suggested by an identity proposer 420. Since the identity proposer 420 is the current partitioning, this is a measure of confidence of the existing sub-graph. In this case, the proposals from all other proposers 420 may also be calculated, because the resulting $P_{i,j}$ that contains the identity might also have indicators for other proposers. This is the case when multiple proposers already agree with the current identity partitioning and their presence in the feature vector may provide signal to the model that it is a high quality partitioning, in some embodiments.

Selected partitionings 438 may be provided to data access 440 which may add equivalence data 442 to database 460 that stores tables 462 to generate modified data records to indicate the matches and probability values. For example, additional columns may be appended (e.g., three columns) to records 464. In such an example, column A may assign a unique ID to each record such that if two records share an ID, then they are deemed to be equivalent (e.g., column A may be an equivalence class ID). Every unique ID in column A may be associated with a single sub-graph identified in column B (so that a sub-graph consists of one or more equivalence class ID's). Every sub-graph may furthermore be assigned a confidence score, which may be in column C. The confidence score may represent the probability that the record matching system has in the partitioning of the sub-graph. A match completion indication 444 may be sent to a requesting client, in some embodiments, which may indicate where and how to retrieve the results (e.g., how to locate, access, or view equivalence data).

Figure 6:
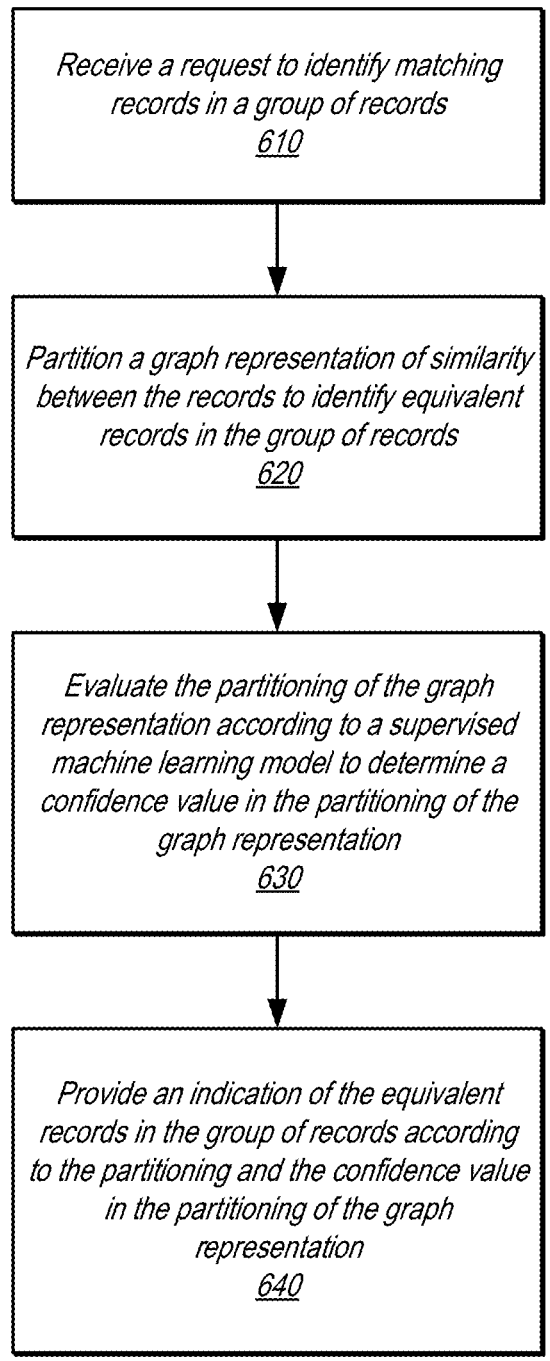
FIG. 6 illustrates a high-level flowchart of various methods and techniques to implement supervised graph partitioning for record matching, according to some embodiments.

Although FIGS. 2-5 have been described and illustrated in the context of a provider network implementing a record linkage service, the various components illustrated and described in FIGS. 2-5 may be easily applied to other data processing systems that can access and match records on behalf of clients. As such, FIGS. 2-5 are not intended to be limiting as to other embodiments of supervised graph partitioning for record matching. FIG. 6 illustrates a high-level flowchart of various methods and techniques to implement supervised graph partitioning for record matching, according to some embodiments. Various different systems and devices may implement the various methods and techniques described below, either singly or working together. For example, a data entry tool, system, or service may identify duplicate records using some or all of the various methods. Therefore, the above examples and or any other systems or devices referenced as performing the illustrated method, are not intended to be limiting as to other different components, modules, systems, or devices.

As indicated at 610, a request to identify matching records in a group of records may be received, in some embodiments. For example, a programmatic interface, command line application, and/or graphical user interface may allow a request to specify a table, database, storage location, or other source of records. In some embodiments, the request may allow for the inclusion of match criteria, thresholds, or other information to determine the link, association, or other indication of when records match. In some embodiments, the request may be rejected if the records have not been previously ingested (e.g., as discussed in FIG. 3) whereas in other embodiments, an ingestion task or workflow may be started if no records have yet been ingested.

As indicated at 620, a graph representation of similarity between the records may be partitioned to identify equivalent records in the group of records, in some embodiments. The graph representation may be a sub-graph, as discussed above, or may be a larger graph upon which no sub-graphs have yet been generated, in some embodiments. In some embodiments, the graph representation may be provided or identified in the request (e.g., instead of the data records directly). The partitioning of the graph representation may be performed according various partition techniques, such as those discussed above, like Transitive Closure, Markov Cluster Algorithm (MCL), Center, Merge-Center, and K-Core, among others.

As indicated at 630, the partitioning of the graph representation may be evaluated according to a supervised machine learning model to determine a confidence value in the partitioning of the graph representation is correct, in some embodiments. A classification model, or other trained model may, for instance be applied to evaluate the partitioning in view of the ground truth training for correct matches reflected in the model. In some embodiments, different machine learning models may be selected according to the request (e.g., as may be specified in the request).

As indicated at 640, an indication of the equivalent records in the group of records according to the partitioning and the confidence in the partitioning of the graph representation, in some embodiments. For example, a confidence value may be returned along with a link, pointer, or a file that indicates the equivalent records. As discussed above with regard to FIG. 4, in some embodiments, an update may be made to the records to add or annotate equivalent records (e.g., equivalence class ids), partitionings (e.g., a sub-graph), and/or confidence values.

Figure 7:
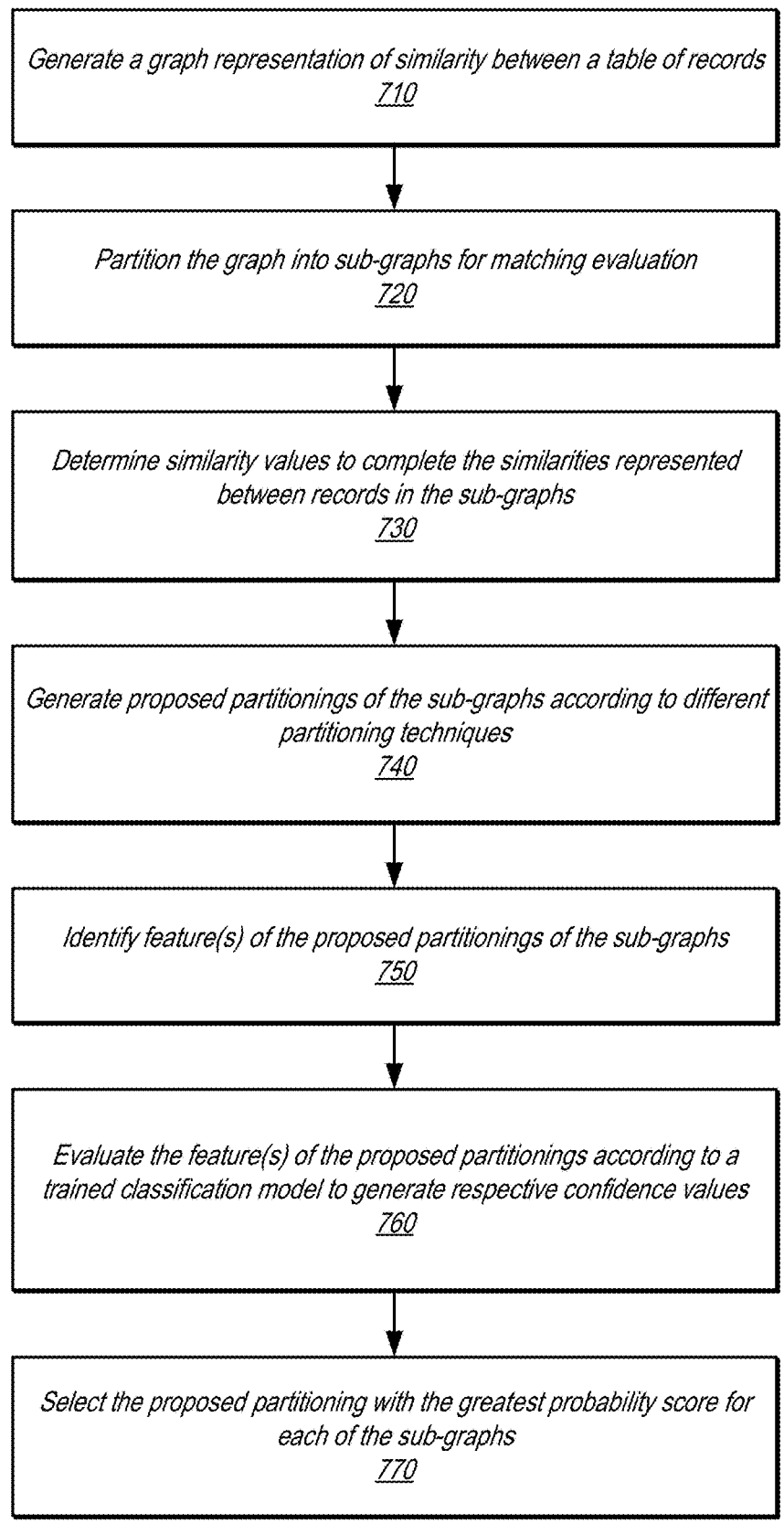
FIG. 7 illustrates a high-level flowchart of various methods and techniques to implement selection of proposed partitionings of sub-graphs of records for record matching, according to some embodiments.

FIG. 7 illustrates a high-level flowchart of various methods and techniques to implement selection of proposed partitionings of sub-graphs of records for record matching, according to some embodiments. As indicated at 710, a graph representation of similarity between a table of records may be generated, in some embodiments. For example, as discussed above a similarity function may be applied to compare records in order to generate similarity values which are then used to construct a graph where nodes represent the records and edges represent the similarity values. Some edges may be not be included in the graph if less than some threshold similarity value (e.g., less than 0.5), in some embodiments. In some embodiments, normalization and blocking may be performed prior to graph generation, as discussed above.

As indicated at 720, the graph may be partitioned into sub-graphs for matching evaluation, in some embodiments. For example, as discussed above with regard to FIG. 4, a clustering technique such as transitive closure may be applied to generate different clusters, the members of which may then be considered a sub-graph according to the edges in the sub-graph. As indicated at 730, similarity values to complete the similarities represented between records in the sub-graphs may be determined, in some embodiments. For example, the similarity function may be performed among pairs with no edge to determine their edge value.

As indicated at 740, proposed partitionings of the sub-graphs may be generated according to different partition techniques, in some embodiments. As discussed above various different partition techniques may be employed in order to increase the probability that one of the partitionings may be likely to identify equivalent records that reflect a ground truth equivalency for the records. For example, Transitive Closure, Markov Cluster Algorithm (MCL), Center, Merge-Center, and K-Core, among others, may be applied, in some embodiments.

As indicated at 750, feature(s) of the proposed partitionings of the sub-graphs may be identified, in some embodiments. Features may include weighted graph metrics, partition technique identifiers, descriptive features, and features within the data values of the records (e.g., column value). As indicated at 760, the feature(s) of the proposed partitionings may be evaluated according to a trained classification model to generate respective confidence values for the proposed partitionings, in some embodiments. For instance, a feature vector can be constructed and compared with a model feature vector determine a confidence value based on the relative similarity of the vectors. Then, as indicated at 770, the proposed partitioning with a greatest probability score may be selected for each of the sub-graphs, according to some embodiments.

The methods described herein may in various embodiments be implemented by any combination of hardware and software. For example, in one embodiment, the methods may be implemented on or across one or more computer systems (e.g., a computer system as in FIG. 8) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 8:
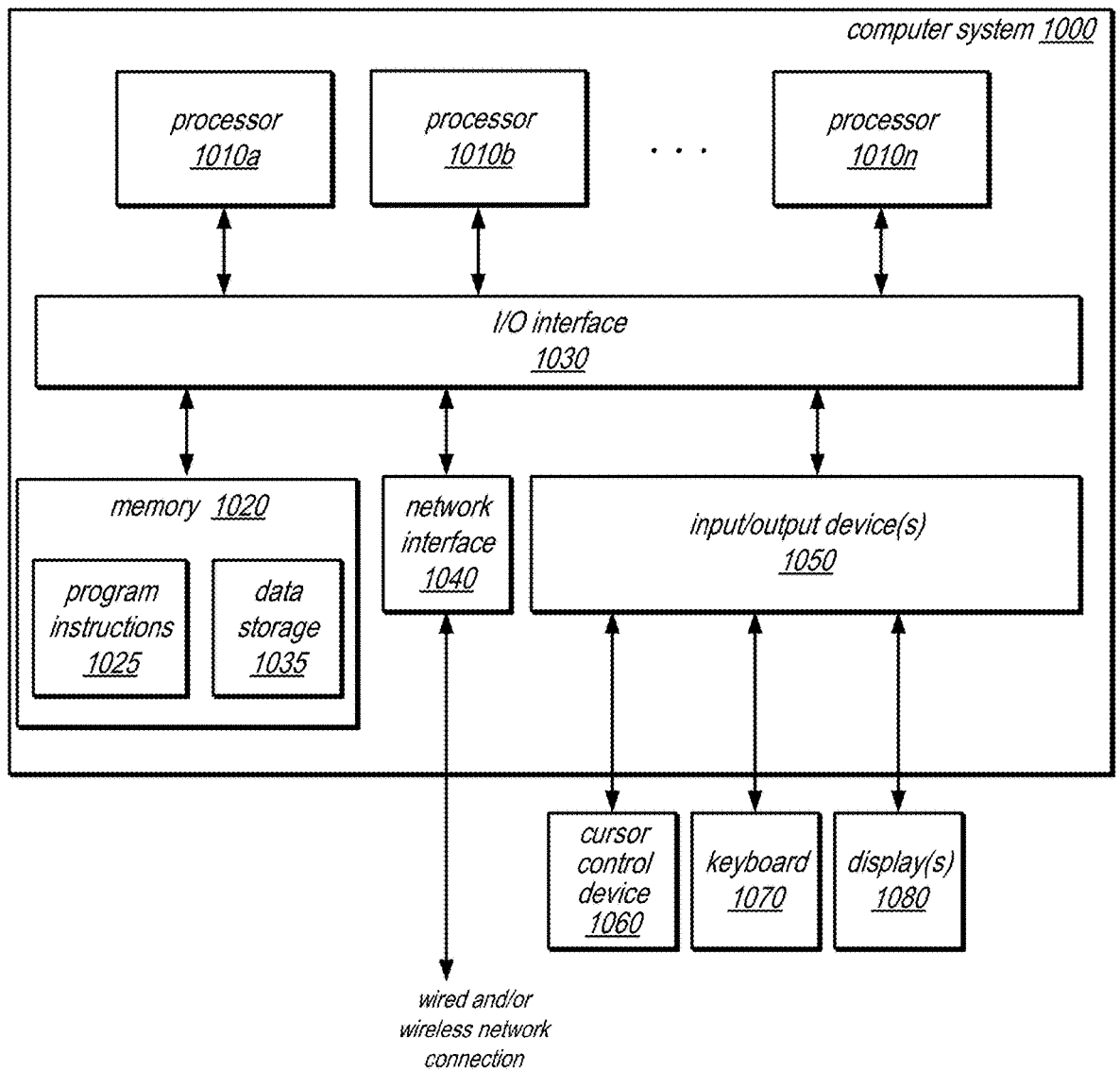
FIG. 8 illustrates an example system to implement the various methods, techniques, and systems described herein, according to some embodiments.

Embodiments of supervised graph partitioning for matching records as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising: at least one processor; and a memory, that stores program instructions that when executed by the at least one processor cause the at least one processor to: generate a graph representation of similarity between a plurality of database records; generate a plurality of proposed partition decisions to partition the graph representation of similarity between the plurality of database records; evaluate the plurality of proposed partition decisions to partition the graph representation according to a supervised machine learning model to determine respective confidence values in the plurality of proposed partition decisions of the graph; select one of the plurality of proposed partition decisions of the graph representation as the partition decision to determine equivalent ones of the database records according to partitioned portions of the graph representation resulting from the partition decision, wherein the selection is based on a comparison of the respective confidence values; and store indications of the equivalent ones of the database records identified according to the selected partition decision of the graph representation and the respective confidence value of the partition decision of the graph representation.

2. The system of claim 1, wherein the graph is a sub-graph of a larger graph representation of similarities between a larger set of database records including the database records, and wherein the program instructions further cause the at least one processor to: generate the larger graph representation of similarities based, at least in part, on a similarity function for pairwise similarity between the larger set of database records; apply a partition technique to the larger graph representation to generate a plurality of sub-graphs including the sub-graph; and wherein the generation of the graph representation, the generation of the plurality of proposed partition decisions, the evaluation, the selection, and the store are performed for each of the sub-graphs.

3. The system of claim 1, wherein the plurality of proposed partition decisions are generated according to different respective partition techniques.

4. The system of claim 1, wherein the plurality of database records are stored in one or more database tables, and wherein to store the indications of the equivalent ones of the database records identified according to the partition decision of the graph representation and the confidence value of the partition decision of the graph representation, the program instructions cause the at least one processor to: add a column to the database tables of respective equivalence classification values so that the equivalent ones of the database records include matching equivalence classification values; and add another column to the database tables with the confidence value as a value in the other column.

5. A method, comprising: generating a plurality of proposed partition decisions to partition a graph representation of similarity between a plurality of records; evaluating the plurality of proposed partition decisions to partition the graph representation according to a supervised machine learning model to determine respective confidence values in the plurality of proposed partition decisions of the graph representation; selecting one of the plurality of proposed partition decisions of the graph representation as the partition decision to determine equivalent ones of the records according to partitioned portions of the graph representation resulting from the partition decision, wherein the selection is based on a comparison of the respective confidence values; and providing an indication of the equivalent ones of the plurality of records according to the selected partition decision of the graph representation and the respective confidence value in the partition decision of the graph representation.

6. The method of claim 5, wherein the graph is a sub-graph of a larger graph representation of similarities between a larger set of records including the records, and wherein the method further comprises: generating the larger graph representation of similarities based, at least in part, on a similarity function for pairwise similarity between the larger set of records; applying a partition technique to the larger graph representation to generate a plurality of sub-graphs including the sub-graph; and wherein the evaluating, the selecting, and the providing are performed for each of the sub-graphs.

7. The method of claim 6, further comprising determining similarity values according to the similarity function to complete similarities represented in each of the sub-graphs before performing the evaluating, the selecting, and the providing for each of the sub-graphs.

8. The method of claim 5, wherein the plurality of proposed partition decisions are generated according to different respective partition techniques.

9. The method of claim 5, wherein selecting the one of the plurality of proposed partition decisions of the graph representation to determine the equivalent ones of the records according to a comparison of the respective confidence values comprises selecting a greatest one of the respective confidence values.

10. The method of claim 5, wherein the evaluating the plurality of proposed partition decisions according to the supervised machine learning model to determine the respective confidence values comprises: identifying respective features of the proposed partition decisions; generating respective feature vectors according to the identified respective features of the proposed partition decisions; and applying a binary classification model as the supervised machine learning model to the respective feature vectors.

11. The method of claim 5, further comprising: before evaluating the plurality of proposed partition decisions of the graph representation: receiving input to train the supervised machine learning model; and generating the supervised machine learning model based, at least in part, on the received input.

12. The method of claim 5, wherein the plurality of records are stored in one or more database tables, and wherein providing the indication of the equivalent ones of the records and the confidence value in the partition decision comprises: adding a column to the database tables of respective equivalence classification values to the records that indicate the equivalent ones of the records with matching equivalence classification values; and adding another column to the database tables with the confidence value as a value in the other column.

13. The method of claim 5, wherein providing the indication of the equivalent ones of the records in the plurality of records and the confidence value in the partition decision of the graph representation comprises: sending information to access the indication of the equivalent ones of the records identified by the partition decision and the confidence value to a client application.

14. One or more non-transitory, computer-readable storage media, storing program instructions that when executed on or across one or more computing devices cause the one or more computing devices to implement: generating a plurality of proposed partition decisions to partition a graph representation of similarity between a plurality of records; evaluating the plurality of proposed partition decisions to partition the graph representation according to a supervised machine learning model to determine respective confidence values in the plurality of proposed partition decisions of the graph representation; selecting one of the plurality of proposed partition decisions of the graph representation as the partition decision to determine equivalent ones of the records according to partitioned portions of the graph representation resulting from the partition decision, wherein the selection is based on a comparison of the respective confidence values; and storing an indication of the equivalent ones of the records identified according to the selected partition decision of the graph representation and the respective confidence value in the partition decision of the graph representation.

15. The one or more non-transitory, computer-readable storage media of claim 14, wherein the plurality of proposed partition decisions are generated according to different respective partition techniques.

16. The one or more non-transitory, computer-readable storage media of claim 14, wherein the program instructions cause the one or more computing devices to further implement: before evaluating the plurality of proposed partition decisions of the graph representation: receiving input to train the supervised machine learning model; and generating the supervised machine learning model based, at least in part, on the received input.

17. The one or more non-transitory, computer-readable storage media of claim 14, wherein an input is received after sending one or more training prompts for the input.

18. The one or more non-transitory, computer-readable storage media of claim 14, wherein the plurality of records are stored in one or more database tables, and wherein, in storing the indications of the equivalent ones of the records identified according to the selected partition decision of the graph representation and the respective confidence value in the partition decision of the graph representation, the program instructions cause the one or more computing devices to further implement: adding a column to the database tables of respective equivalence classification values to the records that indicate the equivalent ones of the records with matching equivalence classification values; and adding another column to the database tables with the confidence value as a value in the other column.

19. The one or more non-transitory, computer-readable storage media of claim 18, wherein the graph is a sub-graph of a larger graph of similarity between a larger set of records that includes the plurality of records, and wherein, in storing the indications of the equivalent ones of the records identified according to the selected partition decision of the graph representation and the respective confidence value in the partition decision of the graph representation, the program instructions cause the one or more computing devices to further implement: adding a further column to the database tables with an identifier of the sub-graph as a value in the further column.

20. The one or more non-transitory, computer-readable storage media of claim 18, wherein the one or more computing devices are implemented as part of a service of a provider network, wherein the records are stored in a database service of the provider network, and wherein the indications of the equivalent ones of the records are stored to the database service.

\* \* \* \* \*